United States Patent [19]

Erickson et al.

[11] Patent Number: 5,289,097
[45] Date of Patent: Feb. 22, 1994

[54] SPINDLE CONTROL METHOD AND APPARATUS FOR DISK DRIVE

[75] Inventors: Kevin J. Erickson; Richard Greenberg, both of Rochester; Douglas W. Nelson, Byron, all of Minn.

[73] Assignee: International Business Machines Corporation, Armonk, N.Y.

[21] Appl. No.: 931,807

[22] Filed: Aug. 18, 1992

[51] Int. Cl.⁵ ............................................. G05B 13/00
[52] U.S. Cl. .................................... 318/561; 318/811
[58] Field of Search ............... 318/804, 805, 811, 812, 318/819, 902, 461, 463, 272, 62, 561

[56] References Cited

U.S. PATENT DOCUMENTS

| | | | |
|---|---|---|---|
| 4,485,337 | 11/1984 | Sandusky. | |
| 4,600,868 | 7/1986 | Bryant | 318/567 |
| 4,751,441 | 6/1988 | Lewis | 318/561 |
| 4,783,774 | 11/1988 | Enomoto. | |
| 4,970,610 | 11/1990 | Knappe. | |
| 4,988,933 | 1/1991 | Ogawa | 318/561 |
| 5,003,415 | 3/1991 | Freeze | 318/561 |
| 5,119,250 | 6/1992 | Green et al. | 318/561 |
| 5,128,813 | 7/1992 | Lee | 318/561 |

OTHER PUBLICATIONS

SGS-Thomson Microelectronics, Spec Description of "Spindle Driver L6232", Dec. 8, 1989, pp. 1 through 11;.

Machine Design, vol. 63, No. 23, Nov. 21, 1991, "Good Motors Get Even Better", pp. 71 through 75;.

Primary Examiner—William M. Shoop, Jr.
Assistant Examiner—Karen Masih
Attorney, Agent, or Firm—Joan Pennington; Richard E. Billion; Pryor A. Garnett

[57] ABSTRACT

A spindle motor control method and apparatus for spindle motor control are provided for use in a direct access storage device. A plurality of operational modes of the direct access storage device are detected. The operational modes of the direct access storage device include start-up and idle operational modes and predetermined critical operational modes that include reading of data and reading of servo information. A pulse width modulation (PWM) mode control for applying driving current to the spindle motor is provided responsive to detecting a start-up or an idle operational mode. A linear mode control for applying driving current to the spindle motor is provided responsive to detecting one of the predetermined critical operational modes. During operation of the disk file, a small percentage of the overall file power-on time is spent performing critical file operations so that substantial power savings are achieved by the PWM mode control. Also since the integrity of the data transferred is critical, the error rate reduction that results by operating in the linear mode during the critical file operations is advantageous.

15 Claims, 2 Drawing Sheets

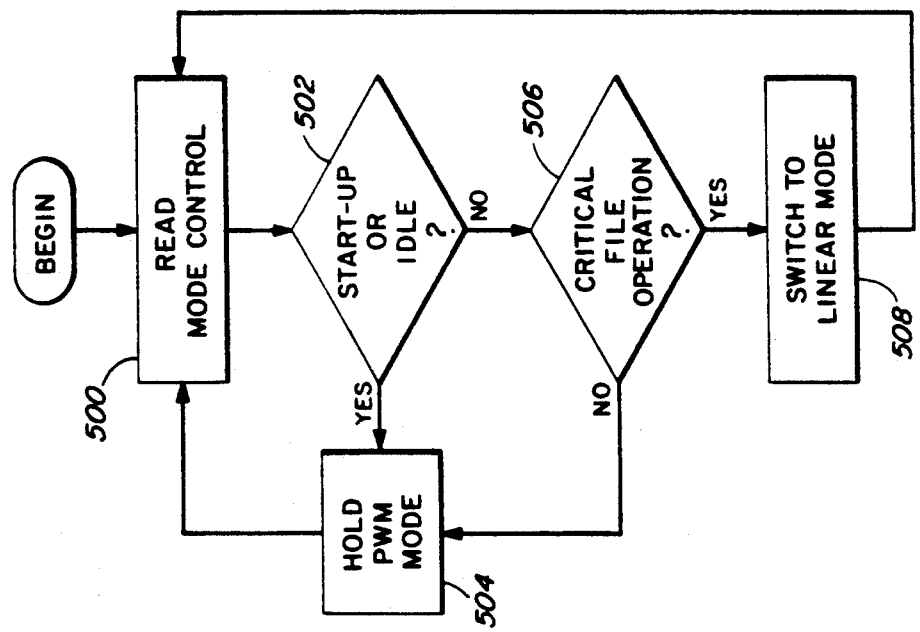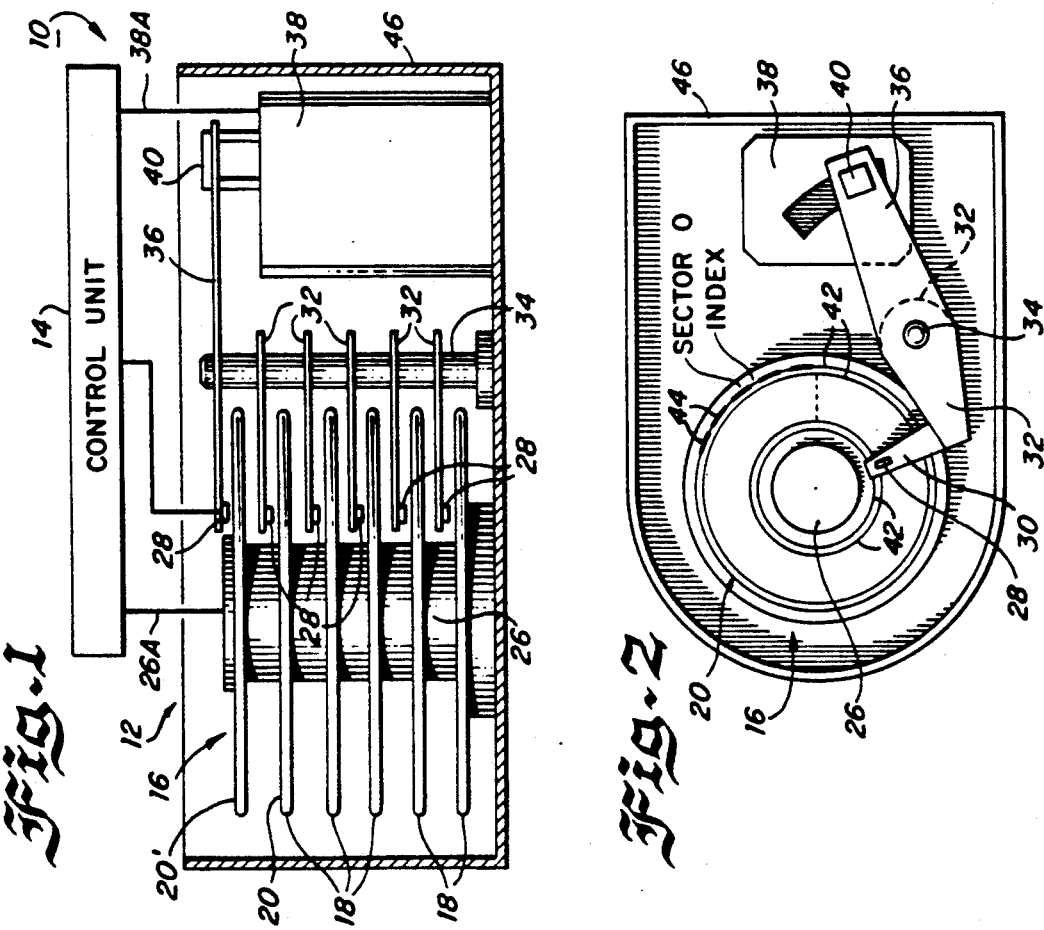

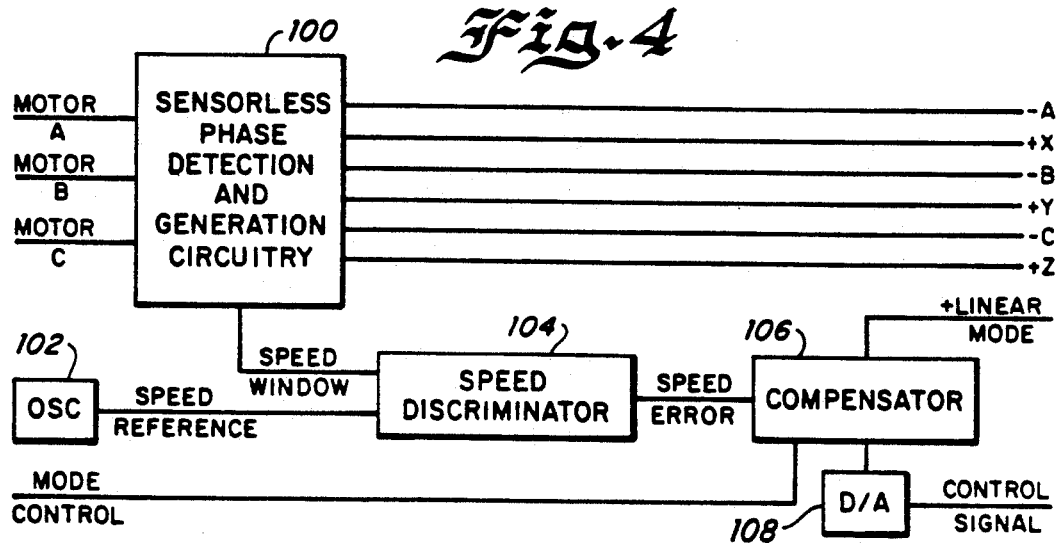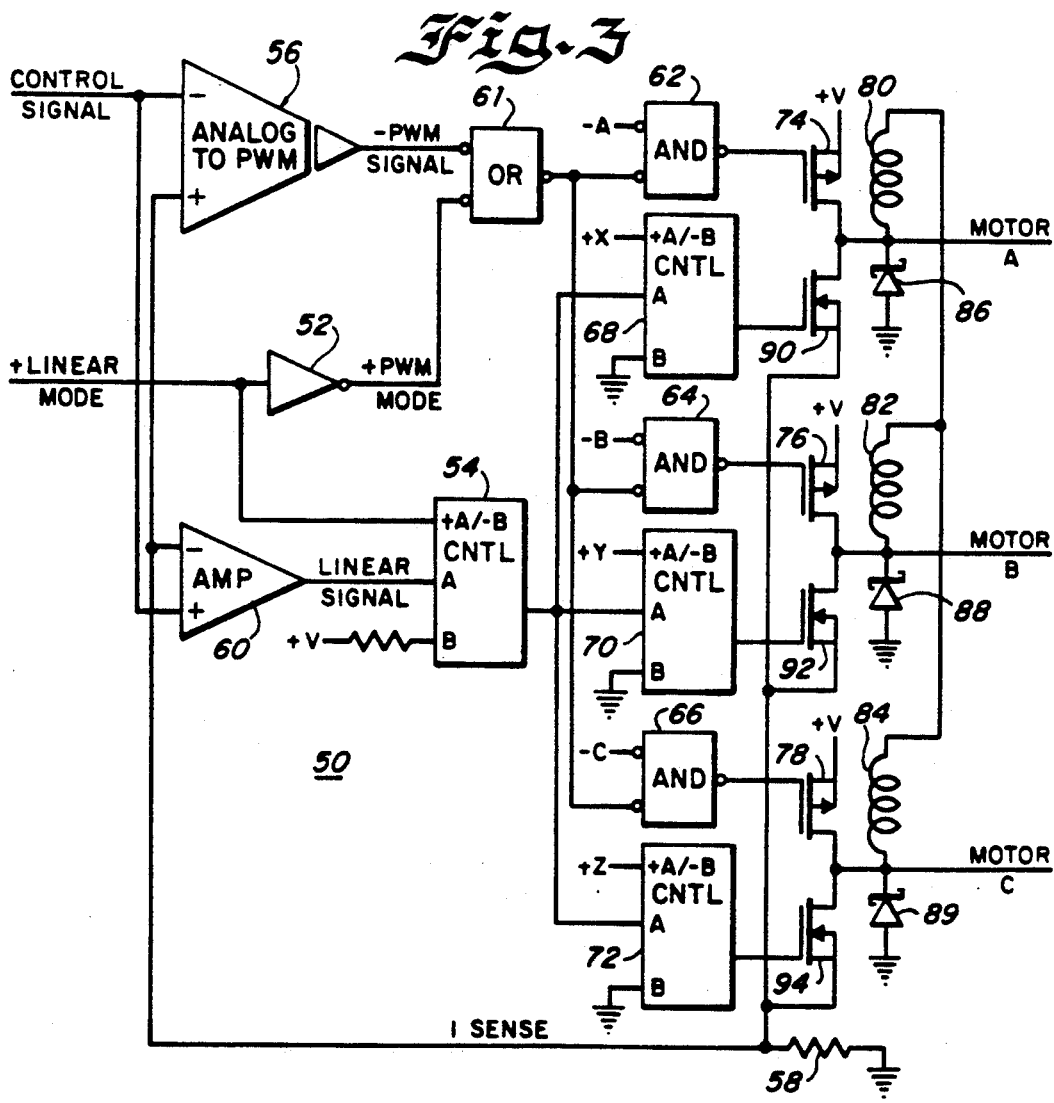

SPINDLE CONTROL METHOD AND APPARATUS FOR DISK DRIVE

BACKGROUND OF THE INVENTION

1. Field of the Invention

The present invention relates to a direct access storage device (DASD) of the type that includes a spindle motor, and more particularly to improved spindle motor control method and apparatus for a direct access storage device.

2. Description of the Prior Art

Disk drive units incorporating stacked, commonly rotated rigid magnetic disks are used for storage of data in magnetic form on the disk surfaces. Typically the disks are mounted in parallel for simultaneous rotation on and by an integrated spindle and motor assembly. Transducer heads driven in a path toward and away from the drive axis write data to the disks and read data from the disks. Data is recorded in data information tracks arrayed on the surfaces of the disks.

Typically a brushless, direct current (DC), spindle motor is used in disk drives. Two methods for spindle motor control include a linear drive method and a pulse width modulation (PWM) drive method. The PWM drive method has been used to limit the high power dissipation, particularly that occurs at start-up. The linear drive method is the most popular because of its relatively low electrical noise characteristics.

A commercially available driver device part number L6232 manufactured and sold by SGS-Thompson Microelectronics for use in brushless DC motor applications and particularly for use with disk drive applications includes circuitry to perform PWM and linear motor speed control. The spindle driver is described for use to limit the high power dissipation that occurs during spindle start-up through the use of the PWM mode and then to switch to linear motor control during operation at the normal operating spindle speed.

Examples of other known motor control systems are provided by U.S. Pat. Nos. 4,485,337; 4,783,774 and 4,970,610.

U S. Pat. No. 4,485,337 discloses a motor speed control circuit for a disk drive that uses servo data retrieved from a servo disk to regulate the motor speed.

U.S. Pat. No. 4,783,774 discloses a control system for an optical information reproducing apparatus including a circuit for modulating a servo control signal to a pulse width modulation (PWM) signal for driving a disc rotation drive motor or the like with a relatively low power consumption.

U.S. Pat. No. 4,970,610 discloses a spindle motor start routine for a disk drive that supersedes the spindle motor primary control when a stuck condition exists. This control includes a starting reaction torque amplification routine for separating transducer heads that adhere to the disk surface when the disks are not rotated. With the spindle motor starting reaction torque amplification control algorithm, a microprocessor controller attempts to start the spindle motor with a series of increasing duty cycle values of a pulse width modulation signal that is proportional to spindle drive current.

While the prior art motor control systems provide generally effective operation, it is desirable to provide an improved apparatus and method for spindle motor control that reduces the power consumption while providing low electrical noise characteristics.

SUMMARY OF THE INVENTION

Important objects of the present invention are to provide an improved method for spindle motor control substantially without negative effects and that overcome many disadvantages of those used in the past.

In brief, the objects and advantages of the present invention are achieved by a spindle motor control method and apparatus for spindle motor control in a direct access storage device. A plurality of operational modes of the direct access storage device are detected. The operational modes of the direct access storage device include start-up and idle operational modes and predetermined critical operational modes including reading of data and reading of servo information. A pulse width modulation (PWM) mode control for applying driving current to the spindle motor is provided responsive to detecting a start-up or an idle operational mode. A linear mode control for applying driving current to the spindle motor is provided responsive to detecting one of the predetermined critical operational modes.

During operation of the disk file, a small percentage of the overall file power-on time is spent performing critical file operations so that substantial power savings are achieved by the PWM mode control. Also since the integrity of the data transferred is critical, the error rate reduction that results by operating in the linear mode during the critical file operations is advantageous.

BRIEF DESCRIPTION OF THE DRAWING

The present invention together with the above and other objects and advantages may best be understood from the following detailed description of the embodiment of the invention illustrated in the drawing, wherein:

FIG. 1 is a schematic and simplified vertical sectional view of a rigid magnetic disk drive unit embodying the present invention;

FIG. 2 is a top plan view of the structure shown in FIG. 1;

FIGS. 3 and 4 are diagrams illustrating apparatus for carrying out the spindle control method according to the present invention in the data storage disk file of FIG. 1; and FIG. 5 is a flow chart illustrating sequential operations of the apparatus of FIGS. 3 and 4.

DETAILED DESCRIPTION OF THE PREFERRED EMBODIMENT

In FIG. 1 there is shown a partly schematic block diagram of parts of a data storage disk file 10 including a rigid magnetic disk drive unit generally designated as 12 and a control unit generally designated as 14. While a magnetic disk drive unit is illustrated, it should be understood that other mechanically moving memory configurations may be used. Unit 12 is illustrated in simplified form sufficient for an understanding of the present invention because the utility of the present invention is not limited to the details of a particular drive unit construction.

Referring now to FIGS. 1 and 2 of the drawing, disk drive unit 12 includes a stack 16 of disks 18 having at least one magnetic surface 20. The disks 18 are mounted in parallel for simultaneous rotation on and by an integrated spindle and motor assembly 26. Data information on each disk 18 are read and/or written to by a corresponding transducer head 28 movable across the disk surface 20. In a disk drive using a dedicated servo, one of the disk surfaces 20' stores servo information used to locate information and data on the other disk surfaces 20. With an alternative embedded servo, each disk surface stores servo information used to locate information and data on its disk surface.

Transducer heads 28 are mounted on flexure springs 30 carried by arms 32 ganged together for simultaneous pivotal movement about a support spindle 34. One of the arms 32 includes an extension 36 driven in a pivotal motion by a head drive motor 38. Although several drive arrangements are commonly used, the motor 38 can include a voice coil motor 40 cooperating with a magnet and core assembly (not seen) operatively controlled for moving the transducer heads 28 in synchronism in a radial direction in order to position the heads in registration with data information tracks or data cylinders 42 to be followed and access particular data sectors 44. In FIG. 2 one sector 44 is illustrated as SECTOR 0 with a fixed index or mark INDEX for properly locating the first data sector. The location of each next sector 44 is identified by a sector identification (SID) pulse read by transducer heads 28 from surfaces 20, 20'.

Although a rotary actuator is shown, it should be understood that a disk drive with a linear actuator can be used. Data storage disk file 10 is a modular unit including a housing 46. The various components of the disk file 10 are controlled in operation by signals generated by control unit 14 such as motor control signals on line 26A and position control signals on line 38A.

In accordance with the method of the invention illustrated and described with respect to FIG. 5, both linear and PWM drive modes are provided for the spindle motor control with selective switching between the modes at predetermined times. Switching between PWM and linear drive modes is provided during operation at the normal operating spindle speed for power and heat dissipation reduction and for electrical noise reduction during critical file operations.

Referring to FIG. 3, there is shown a circuit diagram illustrating a motor drive circuit generally designated 50 for implementing the spindle control method of the invention. Motor drive circuit 50 generates a spindle motor control drive signal indicated at each line labelled MOTOR A, MOTOR B and MOTOR C. The linear drive mode or PWM drive mode is selected by a +LINEAR MODE signal, generated by control circuitry illustrated and described with respect to FIG. 4. At a line labelled +LINEAR MODE, the +LINEAR MODE signal is applied to a inverter gate 52 and an input labelled +A/−B CNTL of an A/B control block 54. A control signal used to control motor speed, generated by control circuitry illustrated and described with respect to FIG. 4, at a line labelled CONTROL SIGNAL is applied to a first input labelled—of an analog-to-PWM amplifier and converter block generally designated 56.

A current feedback signal indicative of the amount of current flowing through the motor windings through a sense resistor 58, at a line labelled I SENSE is applied to a second input labelled + of the analog-to-PWM amplifier and converter block 56 to generate a first PWM error signal at a line labelled −PWM SIGNAL. The current feedback signal I SENSE also is applied to a first input labelled—of an amplifier 60 with the motor speed control signal CONTROL SIGNAL applied to the second input labelled + of the amplifier 60 to generate a second linear error signal at a line labelled LINEAR SIGNAL. The analog output signal LINEAR SIGNAL of amplifier 60 is applied to an input A of the A/B control block 54 with a reference voltage +V applied to the input B. The PWM error signal −PWM SIGNAL and the +PWM MODE select are applied to inverting inputs of an OR gate 61 having its output applied to an inverting input to a plurality of AND gates 62, 64 and 66. The commutation control of the drive current applied to the various motor windings is provided by the six inputs to the drive stage at lines labelled −A, +X, −B, +Y, −C, +Z. The −A, −B, −C signals are applied to AND gates 62, 64 and 66, respectively. Each input +X, +Y, +Z is applied to a corresponding input labelled +A/−B CNTL of a A/B control block 68, 70, 72, as shown. A driver includes a plurality of P-channel field effect transistors (FET's) 74, 76 and 78 respectively coupled to motor windings 80, 82 and 84 of the spindle motor and a Zener diode 86, 88 and 89. The driver includes a plurality of N-channel FET's 90, 92 and 94 similarly arranged with the drain respectively coupled to motor windings 80, 82 and 84. Various commercially available devices such as, low-on resistance P-channel FET's device types IRFR9020 and N-channel FET's device types IRFR 010 manufactured and sold by International Rectifier can be used for the FET's 74, 76 and 78 and the FET's 90, 92 and 94, respectively.

In the linear mode, the first PWM error signal −PWM SIGNAL is gated out such that it has no effect on the drive circuits and the upper FET's 74, 76 and 78 commutate normally with the −A, −B and −C signals. The LINEAR SIGNAL is commutated to the lower FET's 90, 92, 94 by the +X, +Y and +Z signals, with the level of this signal adjusted to provide the necessary motor current control via the lower FET's that are operating in the linear region.

In the PWM mode, the LINEAR SIGNAL is gated out such that it has no effect on the drive circuits and the lower FET's 90, 92, 94 commutate normally with the +X, +Y and +Z signals. The −PWM SIGNAL is passed to the OR gate 61 to subsequent AND gates 62, 64, 66 in the upper FET drive circuits. The −PWM SIGNAL is commutated to the upper FET'S 74, 76, 78 by the −A, −B, and −C signals. The −PWM SIGNAL generates current pulses in the motor windings at a predetermined frequency providing a pulse duration that produces an average current in the motor that is commensurate to the current provided by the linear mode. During the PWM mode, the pulse duration is adjusted to provide the necessary motor current via the upper FET's 74, 76 and 78. When the same motor current control is provided in the PWM mode as compared the linear mode, significantly less power is consumed by the FET drivers because the FET's are being switched either fully on or fully off rather than operating in the linear region. As a result of the lower overall power dissipation in the driver FET's provided by the invention, the overall size of the driver FET's may be reduced to realize an overall cost savings in the amount of required circuitry in terms of silicon real estate.

FIG. 4 provides an exemplary spindle speed control arrangement including a commutation control signals generation block 100 labelled SENSORLESS PHASE DETECTION AND GENERATION CIRCUITRY. The motor drive signals MOTOR A, MOTOR B and MOTOR C which include the back EMF present in these signals are applied to block 100 to generate the commutation control signals −A, +X, −B, +Y, −C, and +Z using conventional, well known sensorless spindle phase detection and generation methods. Block 100 derives a speed window signal indicated at a line labelled SPEED WINDOW. The SPEED WINDOW signal has a duration that is a function of the spindle speed. The SPEED WINDOW signal and a SPEED REFERENCE signal generated by a reference frequency oscillator block 102 is compared at a block 104 labelled SPEED DISCRIMINATOR. A SPEED ERROR signal generated by the SPEED DISCRIMINATOR block 104 is applied to a controller block 106 labelled COMPENSATOR which is used to correct or compensate for the error in the actual spindle speed versus the desired target spindle speed by generating the CONTROL SIGNAL applied to the motor drive circuit 50 of FIG. 3 typically via an digital-to-analog (D/A) converter 108. Another input to the COMPENSATOR block 106 is a MODE CONTROL information signal used to generate the mode control signal, +LINEAR MODE applied to the motor drive circuit 50 of FIG. 3. The MODE CONTROL information signal can be derived from predetermined sources including, for example, such as, read/write control circuits, servo read circuits, interface processor and control unit 14, depending on which spindle control mode is required during particular operations in the file 10.

Further it should be understood that the present invention can be used with spindle motor control designs that use Hall sensors for commutation control. Hall sensors detect the phase of the spindle so that block 100 can generate the phases of the commutation control signal based on the three Hall input signals instead of the three motor drive signals.

Referring to FIG. 5, there is shown a flow chart illustrating sequential operations performed by the COMPENSATOR block 106 for generating the mode control signal, +LINEAR MODE. The spindle motor control method begins with the COMPENSATOR 106 reading the MODE CONTROL information signal as indicated at a block 500. Next start-up or idle operation can be identified as indicated at a decision block 502. When start-up or idle operation is identified at decision block 502, then the PWM mode control is provided as indicated at a block 504. Otherwise when start-up or idle operation is not identified at decision block 502, then a critical file operation can be identified as indicated at a decision block 506. When a critical file operation is identified at decision block 506, then operation is switched to linear mode as indicated at a block 508. Otherwise when a critical file operation is not identified at decision block 506, then the PWM mode control is provided at block 504. After switching to linear mode or holding the PWM mode, the sequential operations again return to block 500 to read the MODE CONTROL information signal.

Critical file operations include reading of data and reading of position servo information from the file. Also the writing of data to the file may be defined as a critical file operation. During operation of the disk file 10, a small percentage of the overall file power-on time is spent performing critical file operations so that substantial power savings are achieved by operating in the PWM mode. Also since the integrity of the data transferred is critical, the error rate reduction that results by operating in the linear mode during the critical file operations is advantageous.

While the invention has been described with reference to details of the illustrated embodiment, these details are not intended to limit the scope of the invention as defined in the appended claims.

What is claimed and desired to be secured by Letters Patent of the United States is:

1. A spindle motor control method for a direct access storage device including a multi-phase, brushless spindle motor and first and second half bridge power driver circuits; comprising the steps of:
   detecting start-up and idle operational modes of the direct access storage device;
   applying a pulse width modulation (PWM) signal for gating said first driver circuit for applying PWM driving current to the spindle motor responsive to detecting an idle operational mode;
   applying the PWM signal for gating said first driver circuit responsive to detecting a start-up operational mode of the disk file;
   detecting predetermined critical operational modes of the direct access storage device; and
   applying a linear driving current to the spindle motor responsive to detecting one of said predetermined critical operational modes.

2. A spindle motor control method as recited in claim 1, wherein said step of detecting start-up and idle operational modes of the direct access storage device includes the step of detecting an idle operational mode at normal spindle operating speed.

3. A spindle motor control method as recited in claim 1 further includes the step of applying a linear mode of operation for said second driver circuit responsive to detecting a reading operational mode of the disk file.

4. A spindle motor control method as recited in claim 1 further includes the step of applying a linear mode of operation for said second driver circuit responsive to detecting a writing operational mode of the disk file.

5. A spindle motor control method as recited in claim 1 further includes the steps of generating a speed error signal by comparing an actual spindle speed with a predetermined spindle speed and generating a control signal responsive to said generated speed error signal.

6. A spindle motor control method as recited in claim 5 further includes the steps of detecting a current sense feedback signal and generating PWM and linear second error signals responsive to identifying a difference between said generated control signal and said detected current sense feedback signal.

7. Apparatus for spindle motor control comprising:
   means for detecting a plurality of operational modes of the disk file; said plurality of operational modes including start-up, idle, data reading, servo information reading, and writing operational modes;
   means for generating a pulse width modulation (PWM) mode of spindle motor control responsive to a detected start-up or idle operational mode by said detecting means; and
   means for generating a linear mode of spindle motor control responsive to a detected data reading operational mode by said detecting means.

8. Apparatus for spindle motor control as recited in claim 7 wherein said means for generating a linear mode of spindle motor control further are responsive to a detected servo information reading operational mode by said detecting means.

9. Apparatus for spindle motor control as recited in claim 7 wherein said means for generating a linear mode of spindle motor control further are responsive to a detected writing operational mode by said detecting means.

10. Apparatus for spindle motor control as recited in claim 7 wherein said PWM and linear modes of spindle motor control include means for means comparing an actual spindle speed with a predetermined spindle speed for generating a speed error signal and means for generating a control signal responsive to said generated speed error signal.

11. Apparatus for spindle motor control as recited in claim 10 further including means for detecting a current sense feedback signal and means for identifying a difference between said generated control signal and said detected current sense feedback signal to generate PWM and linear second error signals.

12. Apparatus for spindle motor control as recited in claim 11 further includes half bridge driver circuits coupled to a multi-phase, brushless spindle motor.

13. Apparatus for spindle motor control as recited in claim 12 wherein said PWM mode control includes means for gating out said generated linear second error signal.

14. Apparatus for spindle motor control as recited in claim 12 wherein said linear mode control includes means for gating out said generated PWM second error signal.

15. A disk file comprising:
a housing;
a plurality of disk surfaces mounted in said housing for simultaneous rotation about an axis;
a plurality of transducer heads mounted for movement across said disk surfaces for reading and writing information to said disk surface;
a control system for controlling a spindle motor; said control system including;
means for detecting a plurality of operational modes of the disk file; said plurality of operational modes including start-up, idle, data reading, servo information reading, and writing operational modes;
means for applying a pulse width modulation (PWM) driving current to said spindle motor responsive to a detected start-up or idle operational mode by said detecting means; and
means for applying a linear driving current to said spindle motor responsive to a detected data reading operational mode by said detecting means.

* * * * *